United States Patent
Chisu et al.

(10) Patent No.: US 11,637,921 B2
(45) Date of Patent: Apr. 25, 2023

(54) ENABLING VIBRATION NOTIFICATION BASED ON ENVIRONMENTAL NOISE

(71) Applicant: Motorola Mobility LLC, Chicago, IL (US)

(72) Inventors: Daniel C. Chisu, Franklin Park, IL (US); Si Chen, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 406 days.

(21) Appl. No.: 16/565,472

(22) Filed: Sep. 9, 2019

(65) Prior Publication Data
US 2021/0074281 A1    Mar. 11, 2021

(51) Int. Cl.
*H04M 1/72454*    (2021.01)
*G06F 3/16*    (2006.01)
(Continued)

(52) U.S. Cl.
CPC ........ *H04M 1/72454* (2021.01); *G06F 3/165* (2013.01); *H04M 1/72409* (2021.01);
(Continued)

(58) Field of Classification Search
CPC ......... H04M 1/72454; H04M 1/72412; H04M 1/72448; H04M 19/044; H04M 19/047; G06F 1/1698; G06F 3/165; G06F 1/163
See application file for complete search history.

(56) References Cited

U.S. PATENT DOCUMENTS 6,085,098 A * 7/2000 Moon ................. G06F 15/0225
                                                                    455/457
9,818,270 B1 * 11/2017 Bendeck ................. H04W 4/38
(Continued)

FOREIGN PATENT DOCUMENTS

CN       107241491 A   * 10/2017   ........ H04M 1/72547
EP       2608497 A1    *  6/2013   ........ H04M 1/72569
(Continued)

OTHER PUBLICATIONS

"CF.lumen", Retrieved at https://play.google.com/store/apps/details?id=eu.chainfire.lumen&hl=en_US—on Aug. 14, 2019, 3 pages.
(Continued)

*Primary Examiner* — Justin R. Blaufeld
(74) *Attorney, Agent, or Firm* — FIG. 1 Patents (57) ABSTRACT

A computing device supports both audible notifications and vibration notifications that are used to notify a user of various different events, such as an incoming voice call or text message. The computing device predicts when a user will have difficulty hearing an audible notification from the computing device due to environmental noise. In response to predicting that a user will have difficulty hearing an audible notification from the computing device due to environmental noise, the computing device enables vibration notifications (if not already enabled) on the computing device. The computing device also optionally communicates with one or more additional devices (e.g., a smartwatch or other wearable device) connected to the computing device to cause those additional devices to also enable vibration notifications. In response to subsequent events for which the user is to be notified, the computing device (and optionally additional devices connected thereto) provides a vibration notification.

20 Claims, 7 Drawing Sheets

(51) Int. Cl.
*H04M 1/72448* (2021.01)
*H04M 19/04* (2006.01)
*H04M 1/72463* (2021.01)
*H04M 1/72409* (2021.01)
*H04M 1/72412* (2021.01)
*G06F 1/16* (2006.01)

(52) U.S. Cl.
CPC ... *H04M 1/72448* (2021.01); *H04M 1/72463* (2021.01); *H04M 19/044* (2013.01); *H04M 19/047* (2013.01); *G06F 1/163* (2013.01); *H04M 1/72412* (2021.01); *H04M 1/724095* (2022.02)

(56) References Cited

U.S. PATENT DOCUMENTS

| | | |
|---|---|---|
| 10,139,906 B1 | 11/2018 | Bai |
| 10,228,899 B2 | 3/2019 | Chisu et al. |
| 10,510,266 B1 | 12/2019 | Huynh |
| 2006/0014569 A1* | 1/2006 | DelGiorno .............. H04M 9/04 455/567 |
| 2008/0036591 A1* | 2/2008 | Ray ................... H04M 1/72454 340/540 |
| 2011/0179355 A1 | 7/2011 | Karlsson |
| 2011/0216179 A1* | 9/2011 | Dialameh .............. G06V 20/20 348/E7.085 |
| 2012/0115501 A1* | 5/2012 | Zheng .................. H04W 4/185 455/456.1 |
| 2013/0078976 A1* | 3/2013 | Naftolin ............ H04M 1/72454 455/418 |
| 2015/0005039 A1* | 1/2015 | Liu ...................... H04M 19/04 455/567 |
| 2015/0029087 A1 | 1/2015 | Klappert et al. |
| 2015/0338919 A1* | 11/2015 | Weber ............... H04M 1/72454 345/156 |
| 2015/0365540 A1* | 12/2015 | Davis ................. H04M 19/042 455/567 |
| 2016/0044151 A1* | 2/2016 | Shoemaker ........... H04M 19/02 455/556.1 |
| 2016/0063828 A1* | 3/2016 | Moussette ......... H04M 1/72454 340/691.5 |
| 2016/0205267 A1* | 7/2016 | Vaughn ................. H04M 19/04 455/566 |
| 2016/0211931 A1 | 7/2016 | Takahashi et al. |
| 2016/0306533 A1 | 10/2016 | Agarwal et al. |
| 2016/0330311 A1* | 11/2016 | Du ........................ G06F 1/1686 |
| 2017/0076564 A1* | 3/2017 | Cruz-Hernandez ...... B60Q 9/00 |
| 2017/0294108 A1* | 10/2017 | Pakula .................. H04M 19/04 |
| 2020/0220966 A1* | 7/2020 | Gupta ............... H04M 1/72457 |

FOREIGN PATENT DOCUMENTS

| | | | | |
|---|---|---|---|---|
| KR | 20100066749 A | * | 6/2010 | ........ H04M 1/72469 |
| WO | WO-2015117347 A1 | * | 8/2015 | ........ H04M 1/72569 |

OTHER PUBLICATIONS

"Create and Manage Notification Channels", Retrieved at: https://developer.android.com/training/notify-user/channels—on Aug. 14, 2019, 10 pages.

"F.lux", Retrieved at: https://justgetflux.com/—on Aug. 14, 2019, 2 pages.

"Fundamentals of Light-Aware User Interfaces", Retrieved at: https://docs.microsoft.com/en-us/windows/win32/sensorsapi/fundamentals-of-light-aware-user-interfaces, May 30, 2018, 4 pages.

Burns,"Moto 360 Sport Review Part II: what no other device has", Retrieved at: https://www.slashgear.com/moto-360-sport-review-part-ii-what-no-other-device-has-17419005/, Dec. 17, 2015, 8 pages.

Martonik,"Emergency alerts and Android: What you need to know", Retrieved at: https://www.androidcentral.com/amber-alerts-and-android-what-you-need-know, Oct. 3, 2018, 9 pages.

Pavlov,"Watch vibration during phone ringing", Retrieved at: https://support.google.com/wearos/thread/33021?hl=en—on Aug. 14, 2019, 2 pages.

Rubino,"How to disable adaptive contrast on the Surface Pro and Surface Book", Retrieved at: https://www.windowscentral.com/how-disable-adapative-contrast-surface, Mar. 6, 2018, 11 pages.

"Non-Final Office Action", U.S. Appl. No. 16/565,466, filed Oct. 19, 2020, 27 pages.

"Notice of Allowance", U.S. Appl. No. 16/565,466, filed Apr. 19, 2021, 10 pages.

* cited by examiner

ENABLING VIBRATION NOTIFICATION BASED ON ENVIRONMENTAL NOISE

BACKGROUND

Many mobile phones as well as other computing devices use both ringtones and vibration to notify the user of an incoming phone call or message. The user can manually activate and deactivate both the ringtones and the vibration, allowing the user to manually select which form of notification he or she receives. In many situations, for example, the user has the mobile phone set so that the ringtone is on and the vibration is off. This can be problematic for the user, such as situations in which the user is at a stadium or concert, because the user may not hear his or her phone ring. These can be frustrating experiences for the user, resulting in user frustration and dissatisfaction with their devices.

BRIEF DESCRIPTION OF THE DRAWINGS

Embodiments of enabling vibration notification based on environmental noise are described with reference to the following drawings. The same numbers are used throughout the drawings to reference like features and components.

DETAILED DESCRIPTION

Enabling vibration notification based on environmental noise is discussed herein. Generally, a computing device supports both audible notifications and vibration notifications. These notifications are used to notify a user of the computing device of various different events, such as an incoming voice call, an incoming text message, a reminder or alert from an application running on the computing device, and so forth. The computing device predicts when a user will have difficulty hearing an audible notification from the computing device due to environmental noise. In response to predicting that a user will have difficulty hearing an audible notification from the computing device due to environmental noise, if not already enabled the computing device enables vibration notifications on the computing device. The computing device also optionally communicates with one or more additional devices (e.g., a smartwatch or other wearable device) connected to the computing device to cause those additional devices to also enable vibration notifications (if not already enabled). In response to subsequent events for which the user is to be notified, the computing device provides (and optionally additional devices connected thereto provide) a vibration notification. As such, the possibility of the user missing a notification is significantly reduced.

The various embodiments described herein improve upon the state of the art by automatically providing vibration notifications of events in response to detecting that a user will have difficulty hearing an audible notification due to environmental noise. This allows important information, such as a message regarding an emergency or an incoming voice call, to be relayed to the user. Without such ability, the user may not be aware that he or she cannot hear an audible notification and may miss an important message or voice call.

The techniques discussed herein thus improve the user experience with their devices because the users are notified of various different events despite being in a noisy environment and regardless of whether they realize they are in a noisy environment and unable to hear audible notifications.

Figure 1:
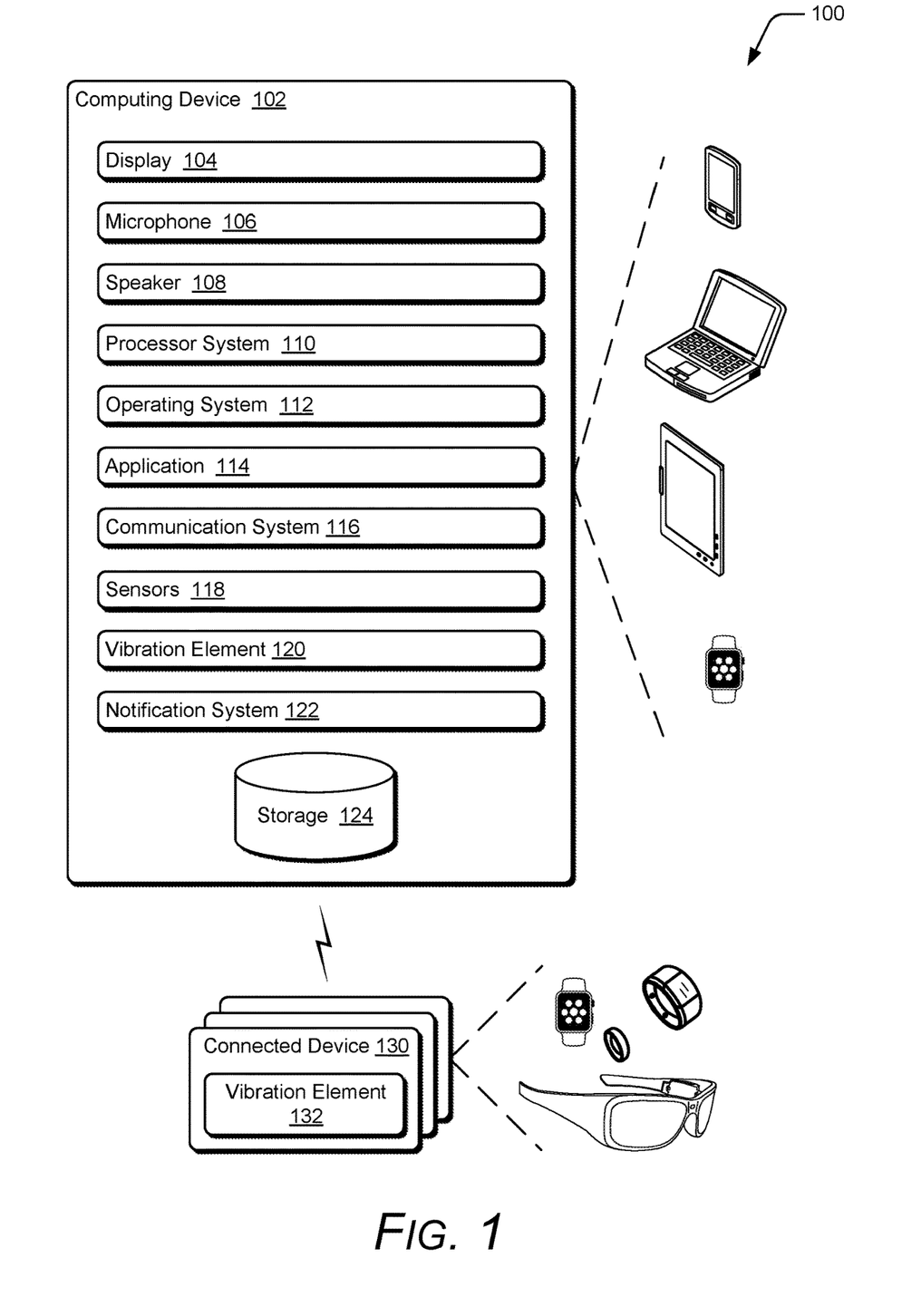
FIG. 1 illustrates an example system implementing the techniques discussed herein.

FIG. 1 illustrates an example system 100 implementing the techniques discussed herein. The system 100 includes a computing device 102, which can be many different types of computing or electronic devices. For example, the computing device 102 can be a smartphone or other wireless phone, a notebook computer (e.g., netbook or ultrabook), a laptop computer, a wearable device (e.g., a smartwatch, augmented reality headsets or glasses, virtual reality headsets or glasses), a tablet or phablet computer, an Internet of Things (IoT) device, and so forth.

The computing device 102 includes a display 104, a microphone 106, and a speaker 108. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the computing device 102, it should be noted that one or more of the display 104, the microphone 106, and the speaker 108 can be implemented separately from the computing device 102. In such situations, the computing device 102 can communicate with the display 104, the microphone 106, and/or the speaker 108 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the microphone 106 may be separate from the computing device 102 and voice inputs received by the microphone 106 are communicated to the computing device 102 via an IR or radio frequency wireless connection.

The computing device 102 also includes a processor system 110 that includes one or more processors, each of which can include one or more cores. The processor system 110 is coupled with, and may implement functionalities of, any other components or modules of the computing device 102 that are described herein. In one or more embodiments, the processor system 110 includes a single processor having a single core. Alternatively, the processor system 110 includes a single processor having multiple cores or multiple processors (each having one or more cores).

The computing device 102 also includes an operating system 112. The operating system 112 manages hardware, software, and firmware resources in the computing device 102. The operating system 112 manages one or more applications 114 running on the computing device 102 and operates as an interface between applications 114 and hardware components of the computing device 102.

The computing device 102 also includes a communication system 116. The communication system manages communication with various other devices, including establishing voice calls with other devices, messaging with other devices, and so forth. This communication can take various forms, such as voice calls (e.g., over a cellular system, public switched telephone network (PSTN), network (e.g., using voice over Internet Protocol (VoIP), etc.), short messaging service (SMS) messages, multimedia messaging service (MMS) messages, and so forth.

The computing device 102 also includes one or more sensors 118. A variety of different types of sensors 118 can be included in the computing device 102, such as a thermal sensor, a proximity sensor, an image capture device (e.g., a camera), an active IR sensor, a passive IR sensor, a fingerprint sensor, and so forth.

The computing device 102 also includes a vibration element 120. The vibration element 120 operates to vibrate the computing device 102 as an alert or notification to the user. The vibration element 120 can be implemented in a variety of different manners, such as using a partially off-balanced motor, electromagnetic induction, and so forth.

The computing device 102 also includes a notification system 122. The notification system 122 provides notifications to a user. These notifications can be provided in response to various different events. An event refers to something (e.g., a situation or an activity) that the user is to be made aware of, such as an incoming voice call, an incoming SMS message, an incoming MMS message, notification or alert data that an application 114 desires to display (e.g., a weather alert, a stock trade alert), an emergency notification or alert, and so forth. The notification system 122 provides audible notifications by playing back various ringtones, audio files, or other tones via the speaker 108. The notification system 122 provides vibration notifications by activating the vibration element 120.

The notification system 122 also predicts when a user will have difficulty hearing an audible notification from the computing device 102 due to environmental noise. In response to predicting that a user will have difficulty hearing an audible notification from the computing device 102 due to environmental noise, if not already enabled the notification system 122 enables vibration notifications on the computing device 122 (optionally at a particular intensity setting, such as the highest intensity setting). In one or more embodiments, the notification system 122 also communicates with one or more additional devices (e.g., a smartwatch or other wearable device) connected to the computing device 102 to cause those additional devices to also enable vibration notifications (optionally at a particular intensity setting, such as the highest intensity setting). Accordingly, when the notification system 122 predicts that a user will have difficulty hearing an audible notification from the computing device 102 due to environmental noise, the notification system 122 provides vibration notifications in response to received events.

The notification system 122 can be implemented in a variety of different manners. For example, the notification system 122 can be implemented as multiple instructions stored on computer-readable storage media and that can be executed by the processor system 110. Additionally or alternatively, the notification system 122 can be implemented at least in part in hardware (e.g., as an application-specific integrated circuit (ASIC), a field-programmable gate array (FPGA), and so forth).

The computing device 102 also includes a storage device 124. The storage device 124 can be implemented using any of a variety of storage technologies, such as magnetic disk, optical disc, Flash or other solid state memory, and so forth. The storage device 124 can store various program instructions and data for the operating system 112, application 114, or communication system 118.

The system 100 also includes one or more connected devices 130. Each connected device 130 can itself be any of a variety of computing devices, such as a wearable device (e.g., a smartwatch, augmented reality headsets or glasses, virtual reality headsets or glasses, jewelry), an Internet of Things (IoT) device, a fitness tracker, and so forth. Each connected device 130 is connected to the computing device 102, and can be, but need not be, connected to each other. Each connected device 130 is connected to the computing device 102 (or another connected device 130) via any of a variety of wired (e.g., USB, IEEE 1394, HDMI) or wireless (e.g., Wi-Fi, Bluetooth, IR) connections. Each connected device 130 also includes a vibration element 132 that operates to vibrate the connected device 130 as an alert or notification to the user. The vibration element 132 can be implemented in a variety of different manners analogous to the vibration element 112, such as using a partially off-balanced motor, electromagnetic induction, and so forth.

Figure 2:
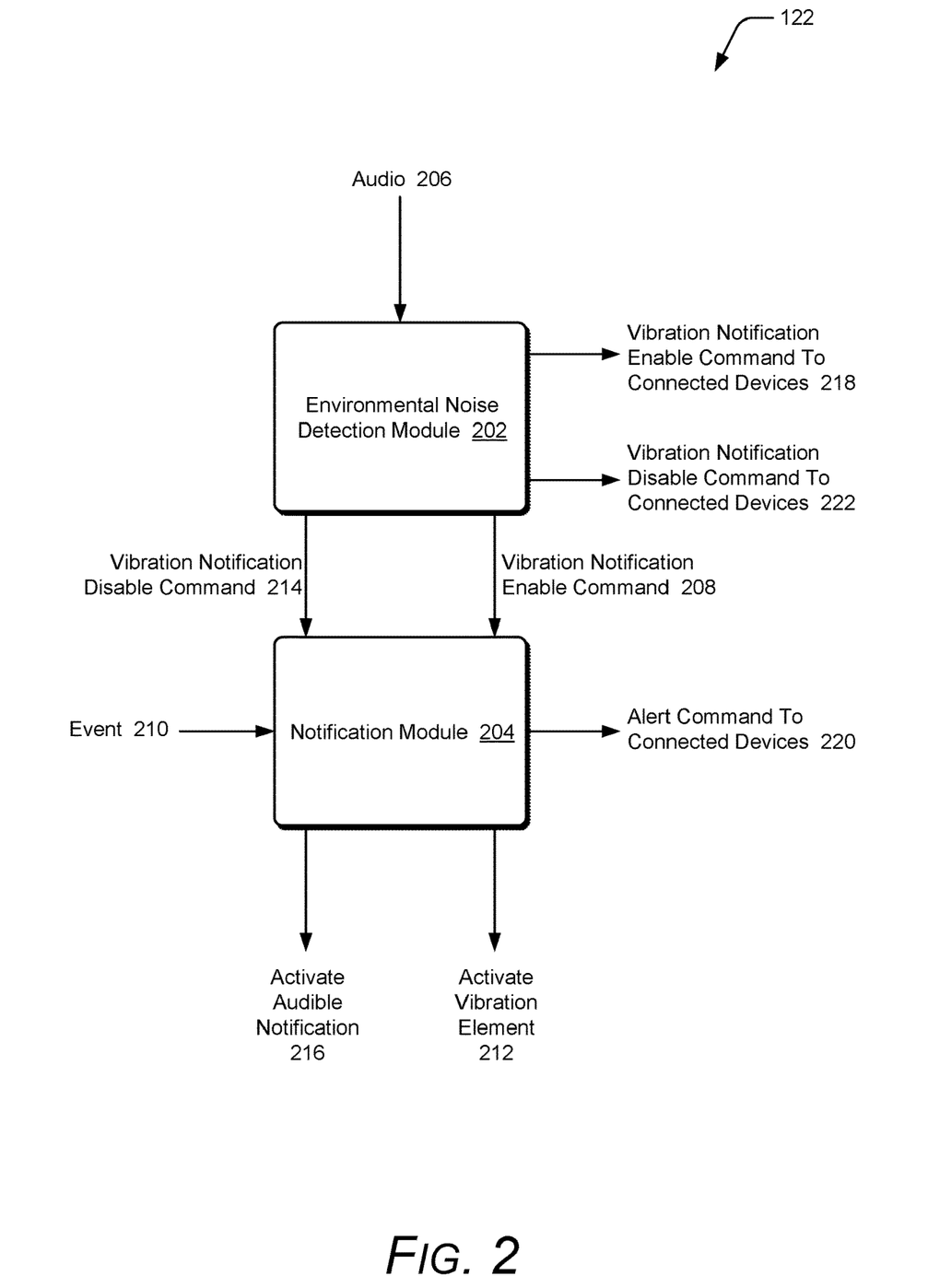
FIG. 2 illustrates an example architecture of a notification system.

FIG. 2 illustrates an example architecture of the notification system 122. The notification system 122 includes an environmental noise detection module 202 and a notification module 204.

The environmental noise detection module 202 receives as input audio 206 from the microphone 106. The environmental noise detection module 202 determines the environmental noise at the computing device 102, which refers to any noise that is detectable by the microphone 106 other than speech that is communicated by a user of the computing device 102.

The environmental noise detection module 202 can distinguish the user's speech from other noise using a variety of techniques. For example, the environmental noise detection module 202 can be trained to recognize sound waves generated by the user's vocal cords over the course of multiple voice calls and identify patterns that can be distinguished from sounds generated from different sources. Additionally or alternatively, the environmental noise detection module 202 can be user-independent and configured to differentiate human speech from other sound sources using Hidden Markov Models, neural networks, other machine learning systems, and so forth. The environmental noise detection module 202 determines a level of the environmental noise and quantifies this level (e.g., in terms of decibels).

In one or more embodiments, the environmental noise detection module 202 predicts or determines whether a user will have difficulty hearing an audible notification at the computing device 102 due to the environmental noise at the computing device 102 based on the environmental noise level by comparing the environmental noise level to a threshold level of environmental noise. The environmental noise detection module 202 predicts or determines that a user will have difficulty hearing an audible notification at the computing device 102 due to the environmental noise in response to the environmental noise level satisfying (e.g., meeting or exceeding) the threshold level of environmental noise, and that a user will not have difficulty hearing an audible notification at the computing device 102 due to the environmental noise in response to the indication of environmental noise not satisfying (e.g., not meeting or not exceeding) the threshold level of environmental noise.

The environmental noise detection module 202 is made aware of a threshold level of environmental noise that, when satisfied, indicates that the environmental noise is likely loud enough to inhibit a user's ability to hear an audible notification. In one or more embodiments, the threshold level of environmental noise is specified by a manufacturer of the computing device 102. Alternatively or additionally, the threshold level of environmental noise is specified by the user of the computing device 102. In one or more embodiments, the environmental noise detection module 202 may periodically prompt the user for feedback regarding whether the user is able to hear audio at the computing device 102. In this manner, the environmental noise detection module 202 can record user feedback and adjust the threshold level of environmental noise to account for different user preferences.

Although a threshold level of environmental noise is discussed, it should be noted that the environmental noise detection module 202 can additionally or alternatively predict whether a user will have difficulty hearing an audible notification at the computing device 102 due to the environmental noise in other manners. For example, various different rules or criteria can be applied to the indication of the environmental noise level to predict or determine whether a user will have difficulty hearing an audible notification at the computing device 102 due to the environmental noise. By way of another example, a machine learning system can be trained on the environmental noise level to predict or determine whether a user will have difficulty hearing an audible notification at the computing device 102 due to the environmental noise.

In response to predicting that the user will have difficulty hearing the audible alert, the environmental noise detection module 202 communicates a vibration notification enable command 208 to the notification module 204, in response to which the notification module 204 enables vibration notifications. In response to receipt of a subsequent event 210, the notification module 204 activates 212 the vibration element 120. The vibration element 120 vibrates for some duration of time, such as until the user responds to the event or the event duration lapses (e.g., a calling party hangs up, a threshold amount of time such as five seconds elapses).

In one or more embodiments, the notification module 204 disables audible notifications in response to the vibration notification enable command 208. Accordingly, in response to the event 210 the notification module 204 does not activate an audible notification. Alternatively, the notification module 204 need not disable audible notifications in response to the vibration notification enable command 208. Accordingly, in response to the event 210 the notification module can activate an audible notification (e.g., playback an audible notification) despite it being likely that the user will have difficulty hearing the audible notification due to the environmental noise.

In one or more embodiments, the vibration notification enable command 208 indicates a particular intensity setting for the vibration element. Different types of vibration elements can have different intensity settings, such as: Low, Medium, and High; an integer value 1 through 10; and so forth. The intensity settings correspond to how much the vibration element vibrates (e.g., a strength of the vibration). For example, the vibration element will vibrate stronger or with more force at a High intensity setting than at a Low intensity setting. These different intensity settings can be implemented in various manners, such as by using different motor speeds for the vibration element. The notification module 204 can maintain a record of the intensity setting for the vibration element as well as notify or adjust the vibration element of (e.g., activate the vibration element at) the intensity setting indicated by the vibration notification enable command 208.

In one or more embodiments, the vibration notification enable command 208 indicates a highest intensity setting for the vibration element (e.g., High or 10). This intensity setting increases the likelihood that the user will be able to feel or sense the vibration when the vibration element is activated.

It should be noted that with different intensity settings for the vibration element, the vibration notification enable command 208 can cause the intensity setting for the vibration element to change even if the vibration element is already enabled. For example, the vibration element may be already enabled at a Low intensity setting, but is changed to a High intensity setting in response to the vibration notification enable command 208.

The environmental noise detection module 202 is configured to continue to monitor environmental noise and determine when the environmental noise drops below a level that makes it likely that a user will have difficulty hearing an audible notification. In response to predicting that the user will no longer have difficulty hearing the audible alert, the environmental noise detection module 202 communicates a vibration notification disable command 214 to the notification module 204, in response to which the notification module 204 disables vibration notifications (or returns the vibration element to the previous intensity setting before the intensity setting was changed in response to the vibration notification enable command 208). In response to receipt of a subsequent event 210, the notification module 204 activates 216 an audible notification (e.g., plays back an audible notification). In situations in which the notification module 204 disables audible notifications in response to the vibration notification enable command 208, the notification module 204 also enables audible notifications in response to the vibration notification disable command 214.

In one or more embodiments, the notification module 204 also monitors whether a user input requesting that vibration notifications be enabled is received after the vibration notification enable command 208 is received and before a next subsequent vibration notification disable command 214 is received. If a user input requesting that vibration notifications be enabled is received after the vibration notification enable command 208 is received and before a next subsequent vibration notification disable command 214 is received then the notification module 204 does not disable vibration notifications in response to the vibration notification disable command 214. Rather, the notification module 204 keeps the vibration element enabled and maintains the vibration element intensity setting at whatever the user input requested.

In one or more embodiments, along with communicating the vibration notification enable command 208 to the notification module 204, the environmental noise detection module 202 also communicates a vibration notification enable command 218 to one or more connected devices 130. The vibration notification enable command 218 is communicated to at least one connected device 130 (and optionally to all connected devices 130) in response to the environmental noise detection module 202 predicting that the user will have difficulty hearing the audible alert. The connected device 130 has a vibration element, which can be any of a variety of different types of vibration elements analogous to the vibration element 120 of the computing device 102 as discussed above. The vibration notification enable command 218 causes the connected device 130 to enable vibration notification. In response to receipt of a subsequent event 210, the notification module 204 communicates an alert command 220 to at least one connected device 130, which causes the connected device 130 to activate its vibration element. The vibration element of the at least one connected device vibrates for some duration of time, such as until the user responds to the event or the event duration lapses (e.g., the computing device 102 notifies the connected device 130 that a calling party hung up, a threshold amount of time such as five seconds elapses).

The connected device 130 can respond to the vibration notification enable command 218 in any of a variety of different manners, such as any of the manners discussed above that the notification module 204 responds to the vibration notification enable command 208. For example, the connected device 130 can disable audible notifications, can set the vibration element of the connected device 130 to a particular intensity setting as indicated by the vibration notification enable command 218, can maintain a record of the intensity setting of the vibration element prior to receipt of the vibration notification enable command 218, and so forth. By causing the vibration element of the connected device 130 to be activated along with the vibration element of the computing device, the likelihood that the user will be able to feel or sense the vibration when the vibration element is activated is increased.

Similarly, along with communicating the vibration notification disable command 214 to the notification module 204, the environmental noise detection module 202 also communicates a vibration notification disable command 222 to one or more connected devices 130. Accordingly, in response to predicting that the user will no longer have difficulty hearing the audible alert, the environmental noise detection module 202 communicates the vibration notification disable command 222 to the at least one connected device 130. The connected device 130 can respond to the vibration notification disable command 222 in any of a variety of different manners, such as any of the manners discussed above that the notification module 204 responds to the vibration notification disable command 214. For example, the vibration notification disable command 222 causes the connected device 130 to disable vibration notification (or return the vibration notification to the previous intensity setting before the intensity setting was changed in response to the vibration notification enable command 222). In response to receipt of a subsequent event 210, the notification module 204 communicates an alert command 220 to the connected device 130, causing the connected device 130 to activate an audible notification (e.g., play back an audible notification). In situations in which the connected device 130 disables audible notifications in response to the vibration notification enable command 218, the connected device 130 also enables audible notifications in response to the vibration notification disable command 222.

In one or more embodiments, the connected device 130 also monitors whether a user input (at the connected device 130 or at the computing device 102 that is communicated to the connected device 130) requesting that vibration notifications be enabled is received after the vibration notification enable command 218 is received and before a next subsequent vibration notification disable command 222 is received. If a user input requesting that vibration notifications be enabled is received after the vibration notification enable command 208 is received and before a next subsequent vibration notification disable command 214 is received then the connected device 130 does not disable vibration notifications in response to the vibration notification disable command 222. Rather, the connected device 130 maintains the vibration element intensity setting at whatever the user input requested.

It should be noted that whether the notification system 122 enables vibration notifications based on environmental noise can be based on a user preference setting. E.g., user input can be received indicating whether the user desires the notification system 122 to automatically use vibration notifications if the notification system 122 predicts or determines that the user will have difficulty hearing an audible notification at the computing device 102 due to the environmental noise.

Thus, in one or more embodiments the environmental noise detection module 202 is configured to continually (e.g., checking the environmental noise at regular or irregular intervals) monitor environmental noise and determine when the environmental noise reaches a level that makes it likely that a user will have difficulty hearing an audible notification. The environmental noise detection module 202 is further configured to continue to subsequently monitor (e.g., checking the environmental noise at regular or irregular intervals) environmental noise and determine when the environmental noise drops below a level that makes it likely that a user will have difficulty hearing an audible notification. It should be noted, however, that in response to a user input requesting that vibration notifications be enabled, the environmental noise detection module 202 ceases monitoring environmental noise and determining whether the environmental noise reaches a level that makes it likely that a user will have difficulty hearing an audible notification and subsequently monitor environmental noise and determine when the environmental noise drops below a level that makes it likely that a user will have difficulty hearing an audible notification. If the user has manually enabled vibration notifications there is no need for the environmental noise detection module 202 to expend system resources (e.g., processing power, energy) monitoring environmental noise because there is no need for vibration notifications to be automatically enabled. However, in response to a subsequent user input requesting that vibration notifications be disabled, the environmental noise detection module 202 resumes monitoring environmental noise and determining when the environmental noise reaches a level that makes it likely that a user will have difficulty hearing an audible notification.

By continually monitoring environmental noise and determining when the environmental noise reaches a level that makes it likely that a user will have difficulty hearing an audible notification, the vibration element 120 (and optionally the vibration element 132) is enabled and ready to operate (vibrate) in response to the event 210. Time need not be expended in enabling (e.g., powering on a motor) in response to the event 210. This allows vibration notifications of events 210 to be provided more quickly.

Furthermore, by continually monitoring environmental noise and determining when the environmental noise drops below a level that makes it likely that a user will have difficulty hearing an audible notification, the vibration element 120 (and optionally the vibration element 132) is disabled when vibration notifications are not needed. Thus, power need not be expended to enable the vibration element.

Figure 3:
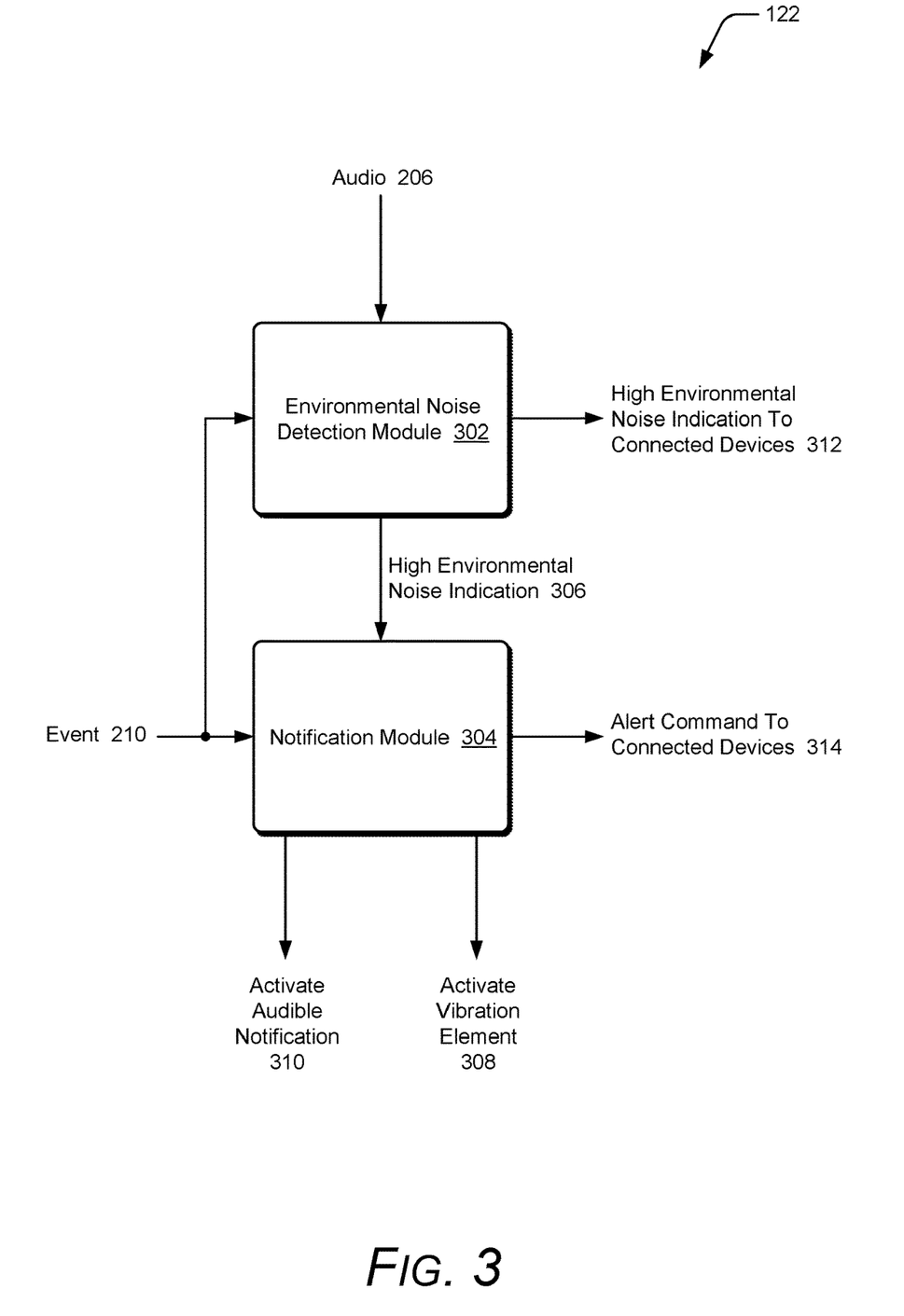
FIG. 3 illustrates another example architecture of a notification system.

FIG. 3 illustrates another example architecture of the notification system 122. In the example of FIG. 3, the notification system 122 includes an environmental noise detection module 302 and a notification module 304. The environmental noise detection module 302 operates in much the same way as the environmental noise detection module 202 of FIG. 2, and the notification module 304 operates in much the same way as the notification module 204 of FIG. 2. However, the operation of the modules 302 and 304 differs from the operation of the modules 202 and 204 in that rather than continually monitoring environmental noise and determining when the environmental noise reaches a level (or drops below a level) that makes it likely that a user will have difficulty hearing an audible notification, the modules 302 and 304 determine whether the environmental noise reaches a level that makes it likely that a user will have difficulty hearing an audible notification in response to an event 210.

In response to an event 210, the environmental noise detection module 202 receives or otherwise obtains as input audio 206 from the microphone 106. The environmental noise detection module 202 determines the environmental noise at the computing device 102, and predicts or determines whether a user will have difficulty hearing an audible notification at the computing device 102 due to the environmental noise at the computing device 102 as discussed above with reference to environmental noise detection module 202.

In response to predicting that the user will have difficulty hearing the audible alert, the environmental noise detection module 302 communicates a high environmental noise indication 306 to the notification module 304. In response to the high environmental noise indication 306 and the event 210, the notification module 304 enables vibration notifications and activates 308 the vibration element 120 (optionally at a particular intensity setting as discussed above with reference to notification module 204). In one or more embodiments, the notification module 304 also disables audible notifications analogous to the notification module 204.

Once vibration of the vibration element 120 is completed (e.g., as a result of the user responding to the event or the event duration lapses (e.g., a calling party hangs up, a threshold amount of time such as five seconds elapses)) the notification module 304 disables vibration notifications (or returns the vibration element 120 to the intensity setting it had prior to receipt of the high environmental noise indication 306). Accordingly, in response to receipt of a subsequent event 210, the notification module 304 activates 310 an audible notification (e.g., plays back an audible notification), unless the environmental noise detection module 302 predicts or determines whether a user will have difficulty hearing an audible notification for the subsequent event 210 at the computing device 102 due to the environmental noise at the computing device 102.

In one or more embodiments, along with communicating the high environmental noise indication 306 to the notification module 304, the environmental noise detection module 302 also communicates a high environmental noise indication 312 to one or more connected devices 130. The vibration notification enable command 218 is communicated to at least one connected device 130 (and optionally to all connected devices 130) in response to the environmental noise detection module 302 predicting that the user will have difficulty hearing the audible alert. In response to the event 210, the notification module 304 also communicates an alert command 314 to at least one connected device 130, which, in combination with the high environmental noise indication 312, causes the connected device 130 to enable vibration notifications and activate its vibration element. In one or more embodiments, the connected device also disables audible notifications in response to the event 210 and the high environmental noise indication 312. Additionally or alternatively, the alert command 314 need not be sent to the at least one connected device 130, in which case the high environmental noise indication 312 also serves as the alert command 314.

Once vibration of the vibration element in the connected device 130 is completed (e.g., as a result of the user responding to the event or the event duration lapses (e.g., the computing device 102 notifies the connected device 130 that a calling party hung up, a threshold amount of time such as five seconds elapses)) the connected device 130 disables vibration notifications (or returns its vibration element to the intensity setting it had prior to receipt of the high environmental noise indication 312).

By determining whether the environmental noise reaches a level that makes it likely that a user will have difficulty hearing an audible notification in response to an event 210 rather than continually monitoring environmental noise and determining when the environmental noise reaches a level (or drops below a level) that makes it likely that a user will have difficulty hearing an audible notification, device resources can be conserved. For example, the notification system 122 need not expend power continually monitoring environmental noise and determining when the environmental noise reaches a level that makes it likely that a user will have difficulty hearing an audible notification.

Figure 4:
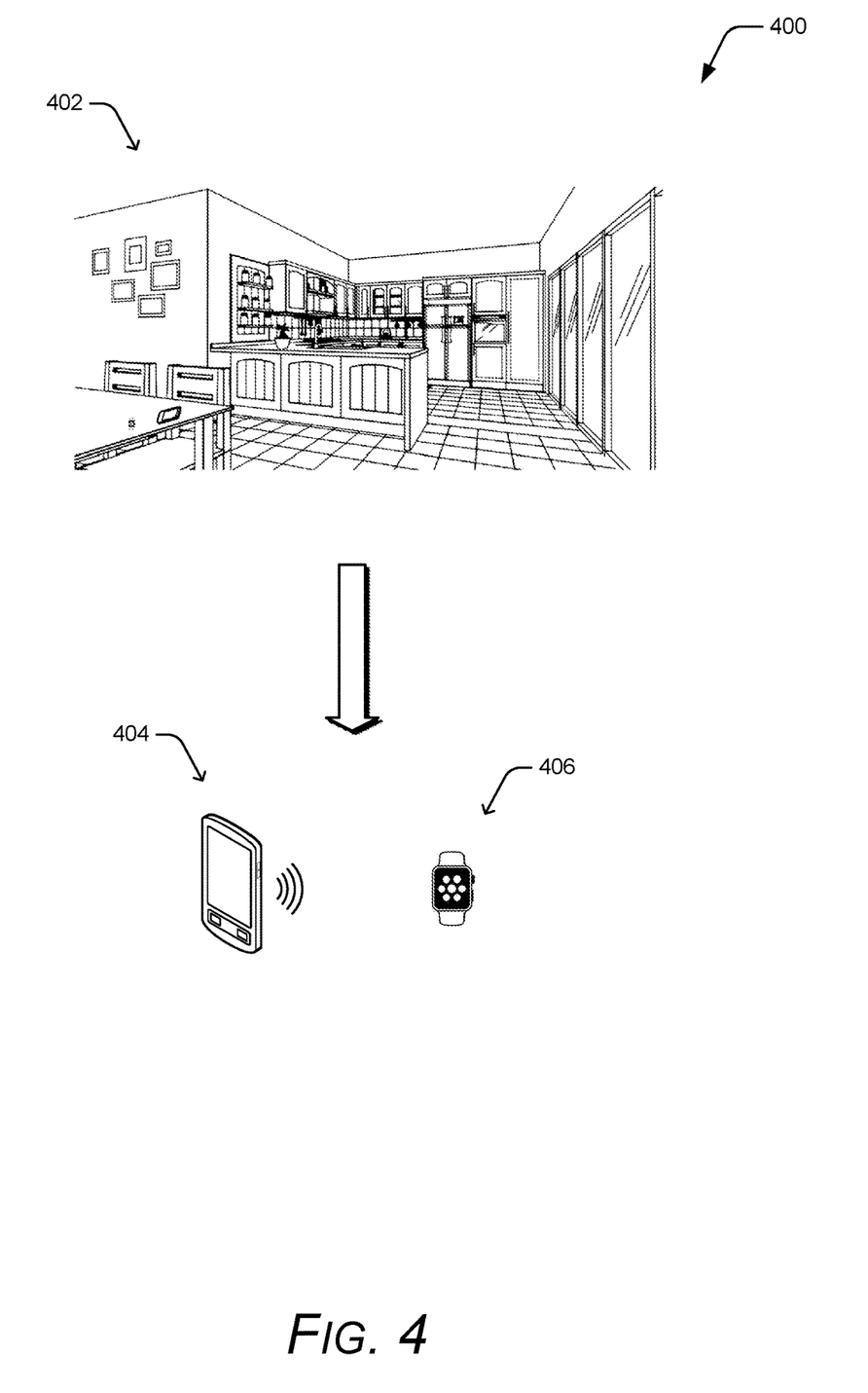
FIG. 4 illustrates an example of the use of the techniques discussed herein.

FIG. 4 illustrates an example 400 of the use of the techniques discussed herein. In the example 400 a computing device 102 that is a mobile phone and a connected device 130 that is a smartwatch are in a quiet kitchen environment 402. The user has the mobile phone set to audible notifications only and the smartwatch set to provide neither audible nor vibration notifications. Accordingly, when an event is received by the notification module 204 or 304, the mobile phone provides an audible notification but no vibration notification, shown at 404, and the smartwatch provides neither an audible notification nor a vibration notification, shown at 406.

Figure 5:
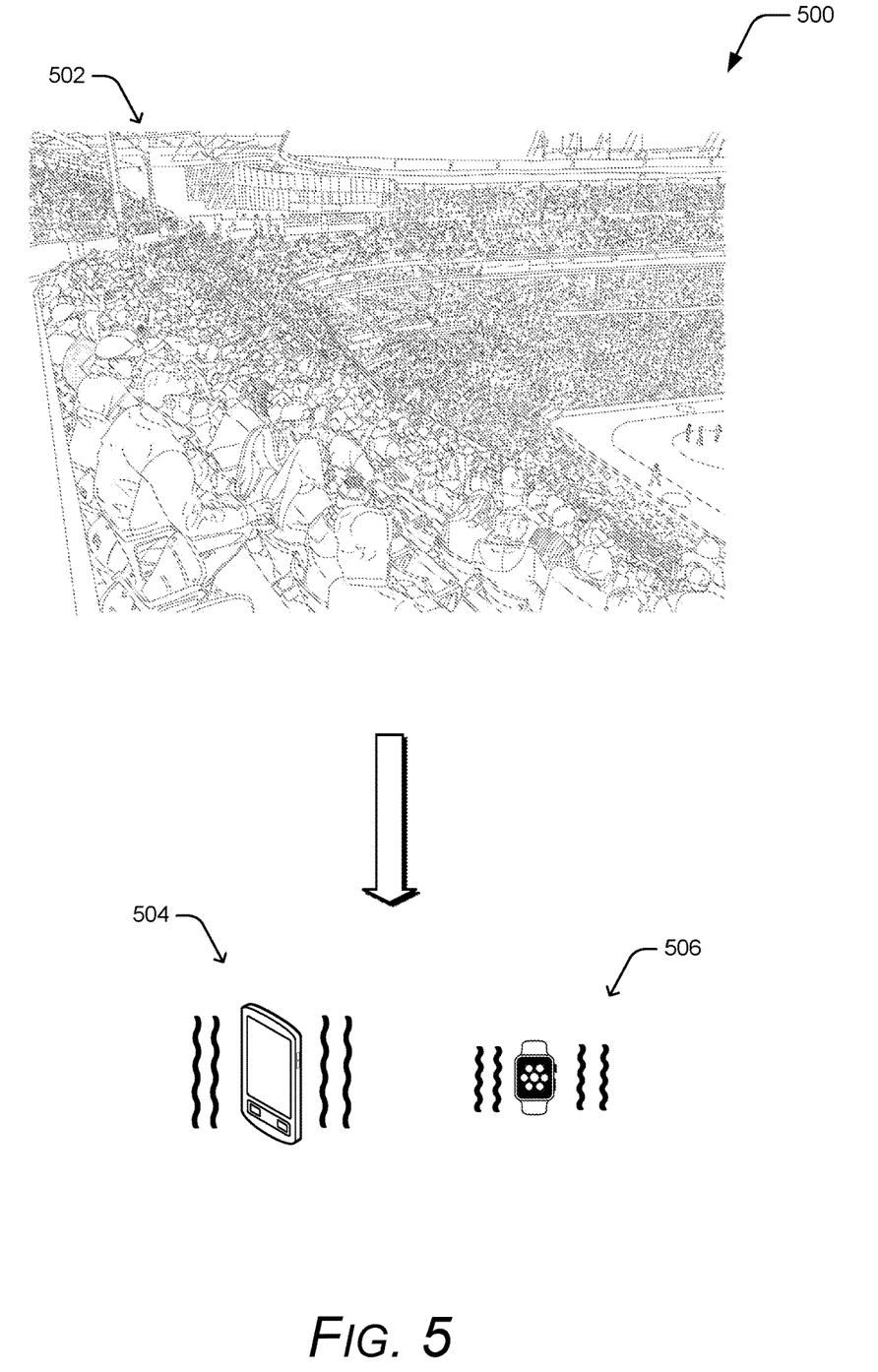
FIG. 5 illustrates another example of the use of the techniques discussed herein.

FIG. 5 illustrates another example 500 of the use of the techniques discussed herein. In the example 500 the computing device that is a mobile phone and the connected device that is a smartwatch are in a noisy stadium environment 502. The user has the mobile phone set to audible notifications only and the smartwatch set to provide neither audible nor vibration notifications. However, the environmental noise detection module 202 predicts or determines that the user will have difficulty hearing an audible notification at the mobile phone due to the environmental noise, and provides the vibration notification enable command 208 to the notification module 204, and the vibration notification enable command 218 to the smartwatch. Additionally or alternatively, the environmental noise detection module 302 predicts or determines that the user will have difficulty hearing an audible notification at the mobile phone due to the environmental noise, and provides the high environmental noise indication 306 to the notification module 304, and the high environmental noise indication 312 to the smartwatch. Accordingly, in response to an event received by the notification module 304, the mobile phone provides a vibration notification, shown at 504, and the smartwatch also provides a vibration notification, shown at 506.

Figure 6:
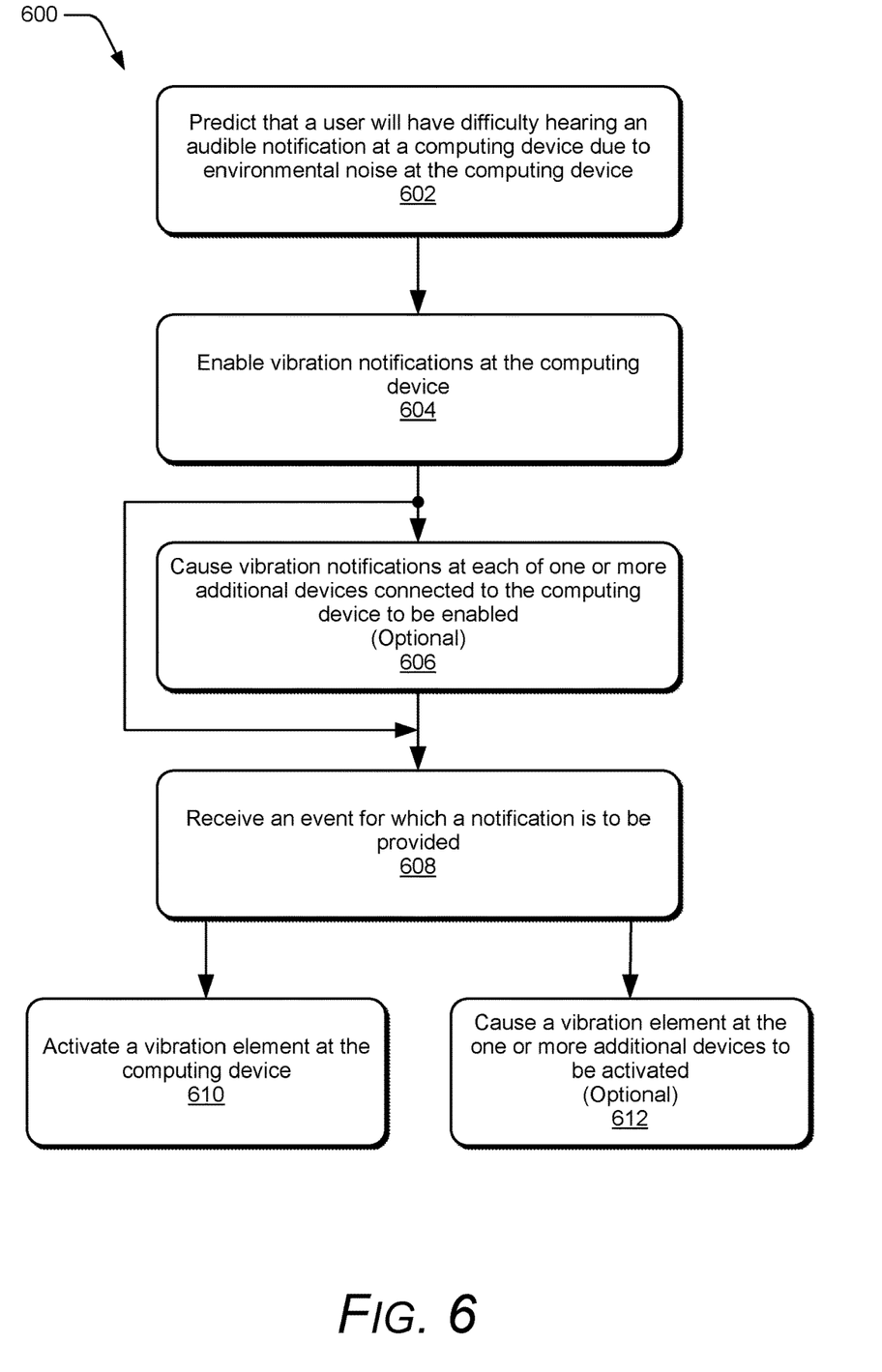
FIG. 6 illustrates an example process for implementing the techniques discussed herein in accordance with one or more embodiments.

FIG. 6 illustrates an example process 600 for implementing the techniques discussed herein in accordance with one or more embodiments. Process 600 is carried out by a notification system, such as the notification system 122 of FIG. 1, FIG. 2, or FIG. 3, and can be implemented in software, firmware, hardware, or combinations thereof. Process 600 is shown as a set of acts and is not limited to the order shown for performing the operations of the various acts.

In process 600, a prediction is made that a user will have difficulty hearing an audible notification at a computing device due to environmental noise at the computing device (act 602). This prediction can be made in various manners, such as by determining whether an environmental noise level at the computing device exceeds a threshold environmental noise level. This prediction can be made continually or in response to receipt of an event as discussed above.

Vibration notifications at the computing device are enabled in response to predicting that the user will have difficulty hearing the audible alert at the computing device (act 604). Vibration notifications can be enabled at a particular intensity setting in act 604, optionally changing the intensity setting at which vibration notifications may have been previously enabled.

Vibration notifications at each of one or more additional devices connected to the computing device can also be caused to be enabled in response to predicting that the user will have difficulty hearing the audible alert at the computing device (act 606). Vibration notifications can be caused to be enabled at a particular intensity setting in act 606, optionally changing the intensity setting at which vibration notifications may have been previously enabled on an additional device.

An event for which a notification is to be provided to a user is received (act 608). The event can be any of a variety of events, such as an incoming voice call, an incoming text message, an alert or other message from an application on the computing device, and so forth.

A vibration element at the computing device is activated in response to receiving the event (act 610). If a particular intensity setting was indicated with the enabling of vibration notifications in act 604 then the vibration element is activated with that particular intensity setting in act 610.

A vibration element at each of one or more additional devices connected to the computing device can also be caused to be activated in response to receiving the event (act 612). If a particular intensity setting was indicated with the enabling of vibration notifications in act 604 then the vibration elements at the one or more additional devices are caused to be activated with that particular intensity setting in act 612. It should be noted that act 612 is optional and need not be performed.

It should be noted that all of the acts shown in process 600 need not be performed. For example, acts 606 and 612 may not be performed.

Figure 7:
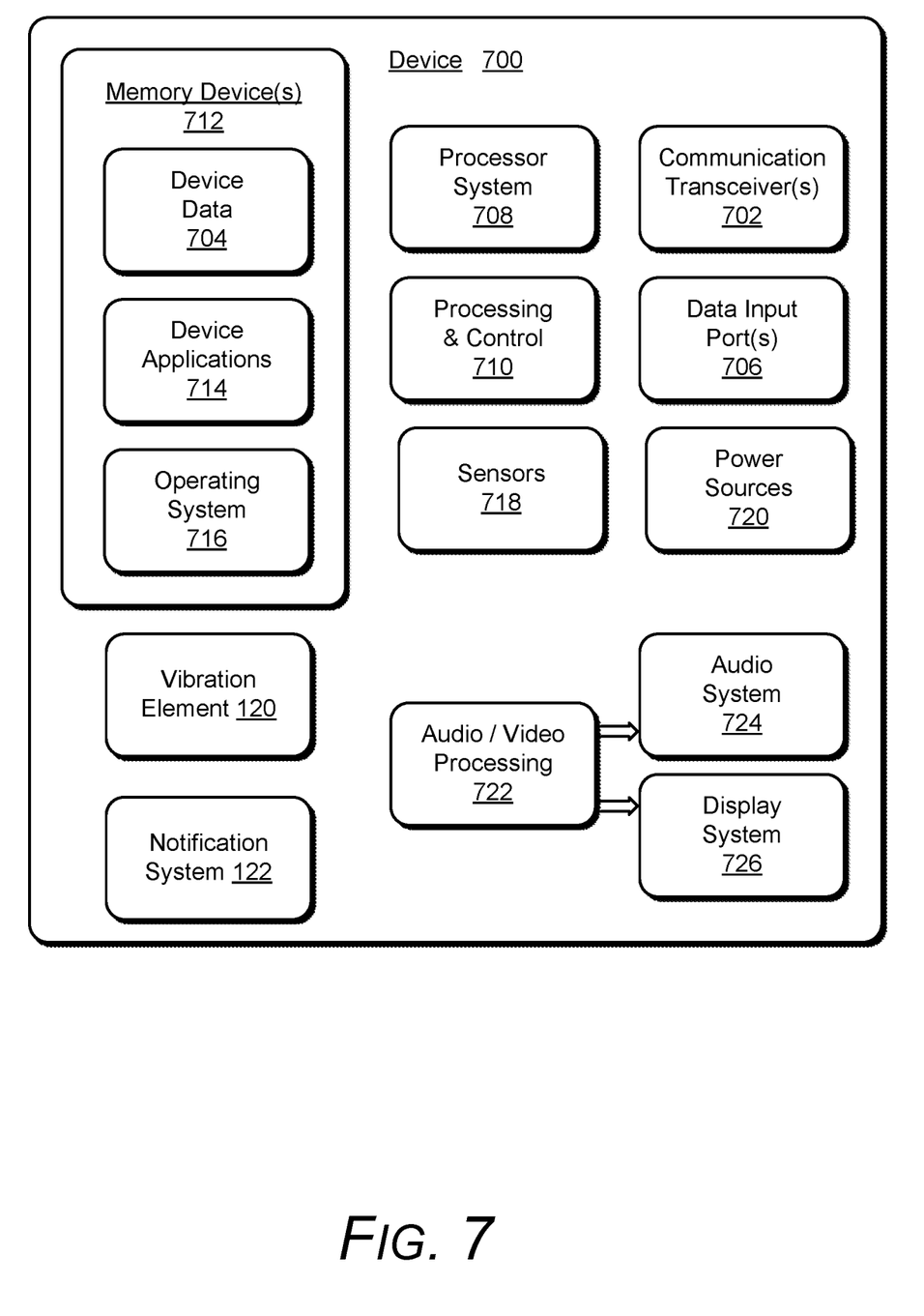
FIG. 7 is an illustration of an example device in accordance with one or more embodiments.

FIG. 7 illustrates various components of an example electronic device 700 in which embodiments of enabling vibration notification based on environmental noise can be implemented. The electronic device 700 can be implemented as any of the devices described with reference to the previous FIGs., such as any type of client device, mobile phone, tablet, computing, communication, entertainment, gaming, media playback, and/or other type of electronic device. In one or more embodiments the electronic device 700 includes a vibration element 120 and a notification system 122, described above.

The device 700 includes communication transceivers 702 that enable wired and/or wireless communication of device data 704 with other devices. The device data 704 can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 700 may also include one or more data input ports 706 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 700 includes a processing system 708 of one or more processors (e.g., any of microprocessors, controllers, and the like) and/or a processor and memory system implemented as a system-on-chip (SoC) that processes computer-executable instructions. The processor system 708 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware.

Alternately or in addition, the device can be implemented with any one or combination of software, hardware, firmware, or fixed logic circuitry that is implemented in connection with processing and control circuits, which are generally identified at 710. The device 700 may further include any type of a system bus or other data and command transfer system that couples the various components within the device. A system bus can include any one or combination of different bus structures and architectures, as well as control and data lines.

The device 700 also includes computer-readable storage memory devices 712 that enable data storage, such as data storage devices that can be accessed by a computing device, and that provide persistent storage of data and executable instructions (e.g., software applications, programs, functions, and the like). Examples of the computer-readable storage memory devices 712 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 700 may also include a mass storage media device.

The computer-readable storage memory device 712 provides data storage mechanisms to store the device data 704, other types of information and/or data, and various device applications 714 (e.g., software applications). For example, an operating system 716 can be maintained as software instructions with a memory device and executed by the processing system 708. Additionally, although illustrated separate from the computer-readable storage memory device 712, the communication system 106 can be maintained as one of device applications 714. The device applications may also include a device manager, such as any form of a control application, software application, signal-processing and control module, code that is native to a particular device, a hardware abstraction layer for a particular device, and so on.

The device 700 can also include one or more device sensors 718, such as any one or more of an ambient light sensor, a proximity sensor, a touch sensor, an infrared (IR) sensor, accelerometer, gyroscope, and the like. The device 700 can also include one or more power sources 720, such as when the device is implemented as a mobile device. The power sources may include a charging and/or power system, and can be implemented as a flexible strip battery, a rechargeable battery, a charged super-capacitor, and/or any other type of active or passive power source.

The device 700 additionally includes an audio and/or video processing system 722 that generates audio data for an audio system 724 and/or generates display data for a display system 726. In accordance with some embodiments, the audio/video processing system 722 is configured to receive call audio data from the communication system 106 and communicate the call audio data to the audio system 724 for playback at the device 700. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link. In implementations, the audio system and/or the display system are integrated components of the example device. Alternatively, the audio system and/or the display system are external, peripheral components to the example device.

Although the embodiments described above have been described in language specific to features or methods, the subject of the appended claims is not necessarily limited to the specific features or methods described. Rather, the specific features and methods are disclosed as example implementations, and other equivalent features and methods are intended to be within the scope of the appended claims. Further, various different embodiments are described, and it is to be appreciated that each described embodiment can be implemented independently or in connection with one or more other described embodiments. Additional aspects of the techniques, features, and/or methods discussed herein relate to one or more of the following:

A method, comprising: predicting that a user will have difficulty hearing an audible notification at a computing device due to environmental noise at the computing device; enabling, in response to predicting that the user will have difficulty hearing the audible predicting comprising that a user will have difficulty hearing an audible notification predicting that a user will have difficulty hearing an audible notification in response to receiving the event, vibration notifications at the computing device; receiving an event for which a notification is to be provided; and activating, in response to receiving the event, a vibration element at the computing device.

Alternatively or in addition to the above described method, any one or combination of the following. The predicting that a user will have difficulty hearing an audible notification comprising predicting that a user will have difficulty hearing an audible notification in response to receiving the event. The predicting that a user will have difficulty hearing an audible notification comprising determining that the environmental noise exceeds a threshold level. The audible notification comprising a ringtone. The enabling comprising enabling vibration notifications in response to an incoming voice call or an incoming message for which an audible notification is to be played. The vibration element comprising a vibration motor of the computing device, and the enabling comprising turning on the vibration motor. The vibration element comprising a vibration motor of the computing device, and the enabling comprising turning on the vibration motor at a highest intensity setting of the vibration motor. The event comprising an incoming voice call or incoming message. The method further comprising causing, in response to predicting that the user will have difficulty hearing the audible notification, vibration notifications at each of one or more additional devices connected to the computing device to be enabled. The method further comprising causing, in response to predicting that the user will no longer have difficulty hearing the audible notification, vibration notifications at each of the one or more additional devices connected to the computing device to be disabled. The method further comprising: predicting that the user will no longer have difficulty hearing the audible notification at the computing device due to environmental noise at the computing device; and disabling, in response to predicting that the user will no longer have difficulty hearing the audible notification, vibration notifications at the computing device.

A computing device comprising: a vibration element; a microphone; one or more processors; and one or more computer readable storage media storing computer-readable instructions which, when executed, perform operations including: determining, based on environmental noise sensed by the microphone, that a user will have difficulty hearing an audible notification at the computing device due to the environmental noise; enabling, in response to predicting that the user will have difficulty hearing the audible notification, vibration notifications at a particular intensity setting at the computing device; receiving an event; and activating, in response to receiving the event, the vibration element at the particular intensity setting.

Alternatively or in addition to the above described computing device, any one or combination of the following. The vibration element comprising a vibration motor and the enabling comprising turning on the vibration motor at a highest intensity setting of the vibration motor. The event comprising an incoming voice call or incoming message. The operations further comprising causing, in response to predicting that the user will have difficulty hearing the audible notification, vibration notifications at the particular intensity setting at each of one or more additional devices connected to the computing device to be enabled.

A system comprising: a vibration element; an environmental noise detection module to predict that a user will have difficulty hearing an audible notification at a computing device due to environmental noise at the computing device, and to enable, in response to predicting that the user will have difficulty hearing the audible notification, vibration notifications at the computing device; and a notification module to receive an event for which a notification is to be provided and activate, in response to receiving the event, the vibration element.

Alternatively or in addition to the above described system, any one or combination of the following. The vibration element comprising a vibration motor of the computing device, and to enable vibration notifications comprises turning on the vibration motor at a highest intensity setting of the vibration motor. The event comprising an incoming voice call or incoming message. The environmental noise detection module being further to cause, in response to predicting that the user will have difficulty hearing the audible notification, vibration notifications at each of one or more additional devices connected to the computing device to be enabled. The environmental noise detection module being further to predict that the user will no longer have difficulty hearing the audible notification at the computing device due to environmental noise at the computing device, and disable, in response to predicting that the user will no longer have difficulty hearing the audible notification, vibration notifications at the computing device.

What is claimed is:

1. A method, comprising:
   receiving user input to enable vibration notifications at a computing device;
   enabling, in response to receiving the user input, vibration notifications for the computing device at a first intensity setting;
   predicting that a user will have difficulty hearing an audible notification at the computing device due to environmental noise at the computing device;
   increasing, in response to predicting that the user will have difficulty hearing the audible notification, a vibration intensity setting for vibration notifications at the computing device from the first intensity setting to a second intensity setting;
   receiving an event for which a notification is to be provided;
   activating, in response to receiving the event, a vibration element of the computing device at the second intensity setting;
   predicting that the user will no longer have difficulty hearing the audible notification due to the environmental noise at the computing device;
   returning, in response to predicting that the user will no longer have difficulty hearing the audible notification, the vibration intensity setting for vibration notifications at the computing device to the first intensity setting;
   enabling, in response to predicting that the user will no longer have difficulty hearing the audible notification, audible notifications at the computing device;
   receiving a subsequent event for which an additional notification is to be provided;
   in response to receiving the subsequent event for which the additional notification is to be provided, activating the vibration element of the computing device at the first intensity setting and activating the audible notification at the computing device;
   receiving an additional user input specifying a third intensity setting for vibration notifications at the computing device;
   in response to receiving the additional user input specifying the third intensity setting, ceasing monitoring the environmental noise at the computing device;
   receiving a further user input to disable vibration notifications at the computing device; and
   in response to receiving the further user input, resuming monitoring the environmental noise at the computing device.

2. The method of claim 1, further comprising predicting, in response to receiving the event, that the user will have difficulty hearing the audible notification.

3. The method of claim 1, the predicting that the user will have difficulty hearing an audible notification comprising determining that the environmental noise exceeds a threshold level.

4. The method of claim 3, further comprising:
   prompting the user for feedback regarding whether the user is able to hear audio from the computing device; and
   adjusting the threshold level of environmental noise based on the feedback.

5. The method of claim 3, wherein the threshold level of environmental noise is specified by the user.

6. The method of claim 1, the audible notification comprising a ringtone.

7. The method of claim 1, the vibration notifications being enabled at both the first intensity setting and the second intensity setting to cause vibration of the vibration element of the computing device in response to an incoming voice call or an incoming message for which an audible notification is to be played.

8. The method of claim 1, the vibration element of the computing device comprising a vibration motor of the computing device, and the method further comprising turning on the vibration motor to enable the vibration notifications.

9. The method of claim 1, the vibration element of the computing device comprising a vibration motor of the computing device, and the increasing the vibration setting comprising turning on the vibration motor at a highest intensity setting of the vibration motor, wherein the second intensity setting is the highest intensity setting.

10. The method of claim 1, the event comprising an incoming voice call or incoming message.

11. The method of claim 1, further comprising predicting, in response to receiving the subsequent event, that the user will no longer have difficulty hearing the audible notification.

12. The method of claim 1, wherein the environmental noise at the computing device is noise that is detected by a microphone of the computing device other than speech that is communicated by a user of the computing device.

13. The method of claim 1, further comprising continually monitoring the environmental noise, and automatically ceasing monitoring the environmental noise when the additional user input is received.

14. The method of claim 1, wherein:
    the enabling the vibration notifications includes enabling the vibration notifications for an additional device connected to the computing device at the first intensity setting;
    the increasing the vibration intensity setting includes increasing the vibration intensity setting for vibration notifications at the additional device from the first intensity setting to the second intensity setting; and
    the returning the vibration intensity setting including returning the vibration intensity setting for vibration notifications at the additional device from the second intensity setting to the first intensity setting.

15. A computing device comprising:
    a vibration element implemented in hardware;
    a microphone;
    one or more processors; and
    one or more computer readable storage media storing computer-readable instructions which, when executed, perform operations including:
    receiving user input to enable vibration notifications at the computing device;

enabling, in response to receiving the user input, vibration notifications for the computing device at a first intensity setting;

determining, based on environmental noise sensed by the microphone, that a user will have difficulty hearing an audible notification at the computing device due to the environmental noise;

increasing, in response to determining that the user will have difficulty hearing the audible notification, a vibration intensity setting for vibration notifications at the computing device from the first intensity setting to a second intensity setting;

in response to receiving an event for which a notification is to be provided, activating the vibration element of the computing device at the second intensity setting;

returning, in response to determining that the user will no longer have difficulty hearing the audible notification, the vibration intensity setting for vibration notifications at the computing device to the first intensity setting;

enabling, in response to determining that the user will no longer have difficulty hearing the audible notification, audible notifications at the computing device;

in response to receiving a subsequent event for which an additional notification is to be provided, activating the vibration element of the computing device at the first intensity setting and activating the audible notification at the computing device;

receiving an additional user input specifying a third intensity setting for vibration notifications at the computing device;

in response to receiving the additional user input specifying the third intensity setting, ceasing monitoring the environmental noise at the computing device;

receiving a further user input to disable vibration notifications at the computing device; and in response to receiving the further user input, resuming monitoring the environmental noise at the computing device.

16. The computing device of claim 15, the vibration element of the computing device comprising a vibration motor and the increasing the vibration setting comprising turning on the vibration motor at a highest intensity setting of the vibration motor, wherein the second intensity setting is the highest intensity setting.

17. A non-transitory computer-readable medium storing instructions, which when executed by a processor, cause the processor to:

receive user input to enable vibration notifications at a computing device;

enable, in response to the user input, vibration notifications for the computing device at a first intensity setting;

determine whether a user will have difficulty hearing an audible notification at the computing device due to environmental noise at the computing device;

increase, in response to determining that the user will have difficulty hearing the audible notification, a vibration intensity setting for vibration notifications at the computing device from the first intensity setting to a second intensity setting;

in response to determining that the user will no longer have difficulty hearing the audible notification, return the vibration intensity setting for vibration notifications at the computing device to the first intensity setting and enable audible notifications at the computing device;

receive an event for which a notification is to be provided while it is determined that the user will have difficulty hearing the audible notification;

in response to receiving the event, activate a vibration element of the computing device at the second intensity setting;

receive a subsequent event for which an additional notification is to be provided while it is determined that the user will not have difficulty hearing the audible notification;

in response to receiving the subsequent event, activate the vibration element of the computing device at the first intensity setting and activate the audible notification at the computing device;

receive an additional user input specifying a third intensity setting for vibration notifications at the computing device;

cease monitoring the environmental noise at the computing device in response to the additional user input specifying the third intensity setting being received;

receive a further user input to disable vibration notifications at the computing device; and resume monitoring the environmental noise at the computing device in response to the further user input being received.

18. The non-transitory computer-readable medium of claim 17, the vibration element of the computing device comprising a vibration motor of the computing device, and to increase the vibration intensity setting comprises turning on the vibration motor at a highest intensity setting of the vibration motor, wherein the second intensity setting is the highest intensity setting.

19. The non-transitory computer-readable medium of claim 17, the instructions further causing the processor to:

determine whether the user will have difficulty hearing the audible notification in response to the event being received; and determine whether the user will have difficulty hearing the audible notification in response to the subsequent event being received.

20. The non-transitory computer-readable medium of claim 17, the instructions further causing the processor to determine that the user will have difficulty hearing the audible notification responsive to a determination that the environmental noise exceeds a threshold level, the threshold level of environmental noise being specified by the user.

* * * * *